Aug. 5, 1958
J. DOMBURG
2,846,511
CIRCUIT-ARRANGEMENT FOR USE IN AN ELECTRONIC AUTOMATIC TELEPHONE EXCHANGE
Filed March 3, 1954
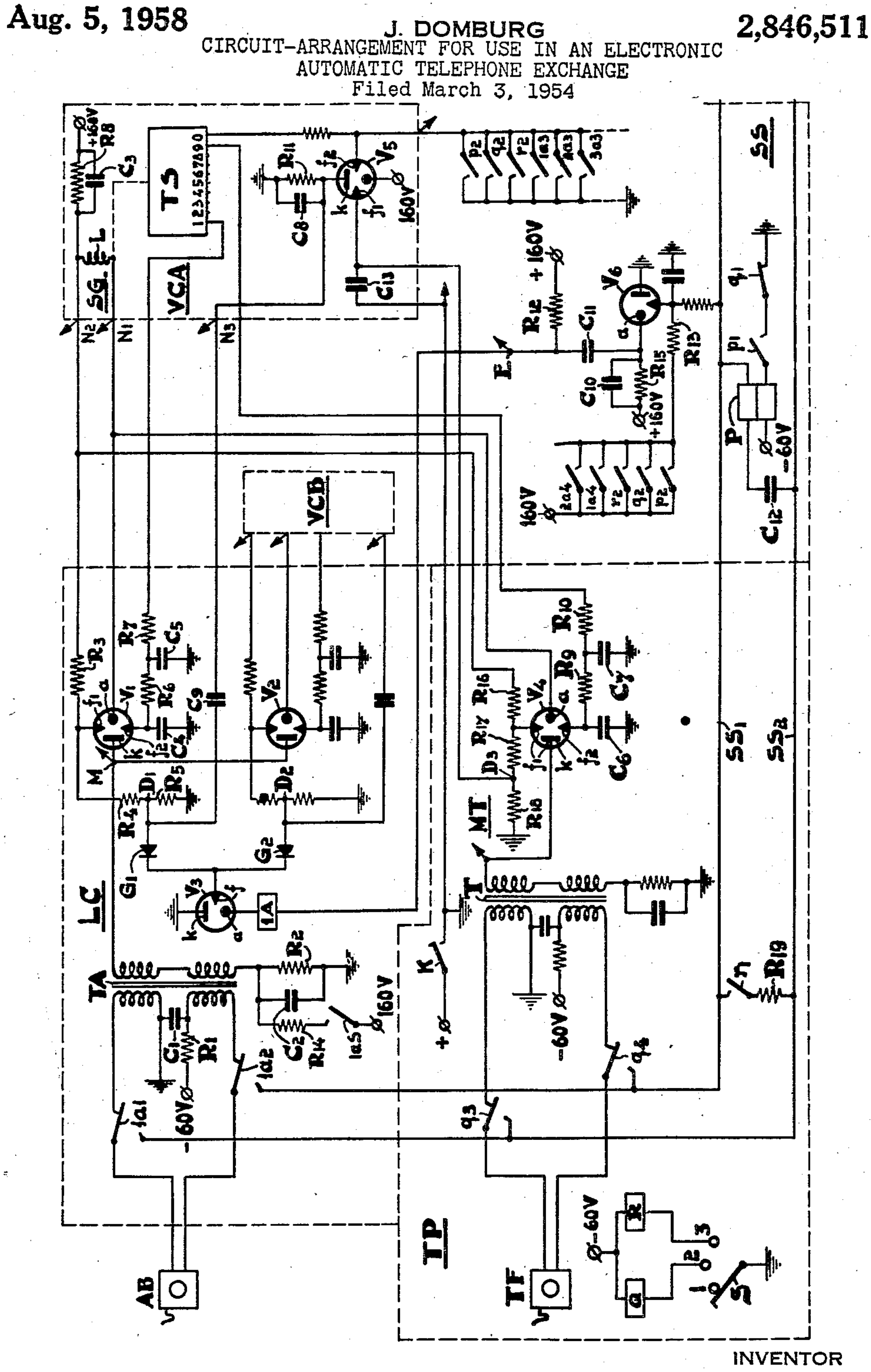
INVENTOR
Jacobus Domburg
BY
AGENT United States Patent Office 2,846,511

Patented Aug. 5, 1958

2,846,511

CIRCUIT-ARRANGEMENT FOR USE IN AN ELECTRONIC AUTOMATIC TELEPHONE EXCHANGE

Jacobus Domburg, Eindhoven, Netherlands, assignor, by mesne assignments, to North American Philips Company, Inc., New York, N. Y., a corporation of Delaware Application March 3, 1954, Serial No. 413,911

Claims priority, application Netherlands March 10, 1953

2 Claims. (Cl. 179—18)

The invention relates to a circuit arrangement for use in an electronic automatic telephone exchange in which a number of apparatuses of a first kind are coupled through discharge paths of gas-filled tubes to an apparatus of a second kind, the gas-filled tubes each containing an ignition electrode.

Such circuit arrangements are used for example to establish an intelligence connection between a subscriber's line and a connecting circuit or vice versa. In this arrangement the intelligence currents are transmitted by conductive discharge paths which act as switch contacts of line finders or selectors. In known circuit arrangements of this kind generally the difficulty arises that apart from the actual intelligence conductor no conductors for special signalling are provided such as in the usual automatic telephone exchanges using mechanical switching means, with the result that signals have to be transmitted by the intelligence conductors. A further limitation consists in that due to the comparatively slight value of the direct current transmitted by a discharge path in an intelligence connection it generally is not possible to cause a relay to respond by means of impulses transmitted by a discharge path without extinguishing the discharge path or producing undesired signals.

The object of the invention is to provide a circuit arrangement enabling signals to be transmitted between two apparatuses between which an intelligence connection is established through a conductive discharge path without the use of the intelligence conductors. A circuit arrangement according to the invention is characterised in that each of the apparatuses of the first kind has an individual auxiliary discharge tube added to it the control electrode of which is connected directly to the ignition electrode of a gas-filled tube associated with the apparatus concerned and the apparatus of the second kind comprises means for supplying a positive pulse to the control electrode of all the auxiliary tubes in a manner such that a pulse renders an auxiliary tube conductive, if the associated gas-filled tube is conductive, and does not render it conductive, if this gas-filled tube is non-conductive. The circuit arrangement may, for example, be used to cause a relay or a subscriber's charge meter to respond, or to ignite a signalling tube.

The invention will now be explained with reference to the accompanying drawing, the single figure of which shows an embodiment thereof given by way of example.

Referring now to the drawing, the figure shows diagrammatically a subscriber's station AB, connected by a subscriber's line to the associated line circuit in an electronic private exchange LC, an operator's position TP, a public line SS and part of a line circuit VCA, a second line circuit being indicated by VCB. The subscriber's station AB is connected through contacts *1a1* and *1a2* of a relay 1A to the ends of two identical windings of a transformer TA connected in the subscriber's line circuit in the private exchange LC. The other ends of these windings are intercoupled through a capacitor C1 and with the interposition of a resistor R1 are connected to the terminals of a 60 volts supply source (not shown). One end of a third winding of the transformer TA is connected to earth through the parallel combination of a resistor R2 and a capacitor C2, the other end being connected through the multiple-wired point M to cathodes *k* of a number of gas-filled tubes only two of which (V1 and V2) are shown in the drawing. These gas-filled tubes each comprise a cathode *k*, an anode *a* and two ignition electrodes *f1* and *f2*, as is shown with respect to the tube V1. The anodes of these gas-filled tubes are connected to intelligence conductors SG in several link circuits. Thus, the anode *a* of the tube V1 is connected through the multiple-wired point N1 to the intelligence conductor SG of the link circuit VCA, which intelligence conductor through an inductance L and the parallel combination of a resistor R8 and a capacitor C3 is connected to a voltage source (not shown). The ignition electrode *f1* of the tube V1 is connected by means of a potentiometer R3, R4, R5 through a multiple-wired point N2 to the common point of the inductance L and the resistor R8. In a similar manner gas-filled tubes of the lines of the remaining subscribers and of the operator's station TP are coupled to the multiple-wired points N1 and N2 of the link circuit VCA, other tubes of the line circuits, for example V2, being similarly connected to the remaining link circuits, for example VCB.

If the subscriber AB in order to originate a call lifts the receiver, a pulse is set up in the transformer TA due to the line loop being completed and as a result the potential of the multiple-wired point M is reduced in a manner such that the potential between the cathode *k* and the ignition electrode *f1* of the gas-filled tubes V1, V2, and so on, which couple the line of the subscriber AB to free link circuits, is increased to exceed the striking value so that in principle all these tubes may ignite. As soon as one of the tubes, for example the tube V1, ignites, current passes through the resistor R8, the inductance L, the discharge path of the gas-filled tube V1 concerned, the winding of the transformer TA and the resistor R2 to earth with the result that on the one hand the potential of the multiple-wired point M increases in a manner preventing other gas-filled tubes coupled to this multiple-wired point from igniting, and on the other hand, the voltage of the multiple-wired point N2 is reduced with the result that the link circuit VCA is marked engaged and can at a subsequent call no longer be occupied, since the potential of the ignition electrode of the remaining tubes coupled to the link circuits VCA assumes a comparatively low value. However, the potential of the ignition electrode *f1* of the conductive gas-filled tube V1 is increased due to the fact that this electrode is ionically coupled to the discharge in the tube V1 and the potential of the cathode *k* is increased.

Thereupon the subscriber dials the desired number, for example the numeral 9, which corresponds with the operator's station TP. The dialling pulses are transmitted by the transformer TA and the main discharge path between the cathode *k* and the anode *a* of the gas-filled tube V1 to the intelligence conductor SG of the link circuit VCA and thence by non-specified means to the diagrammatically shown counting circuit TS. The counting circuit TS which may, for example, be of a kind known per se comprises a number of outgoing points 1, 2, 3 . . . 9, 0 and is arranged in a manner such that the potential of the outgoing point corresponding to the numeral received, in this case 9, is increased. The outgoing points of the counting circuit TS are coupled through time-delay networks to the ignition electrode *f2* of a gas-filled tube arranged in the numerically corresponding subscriber's circuit. Thus, for example, the outgoing point 1 is coupled through a network R6, R7, C4, C5 to the electrode $f2$ of the gas-filled tube V1 arranged in the subscriber's line circuit in the exchange LC and the outgoing point 9 through a network R9, R10, C6, and C7 to the electrode $f2$ of a gas-filled tube V4 arranged in the operator's position TP. When the numeral 9 is dialled, the gas-filled tube V4 ignites due to the increase of the potential of the electrode $f2$, if the operator is not busy. However, if the operator is busy, the multiple-wired point MT is at a comparatively high potential which prevents the gas-filled tube V4 from igniting. Due to the gas-filled tube V4 being ignited an intelligence connection has been established between the subscriber AB and the operator's station TF through the transformer TA, the gas-filled tube V1, the multiple-wired point N1, the gas-filled tube V4 and the transformer T.

Assume now that the subscriber AB wishes to establish a connection to a line connected to a public exchange. After having established a connection to a link circuit, for example VCA, of the private exchange, he dials the numeral 0. The line SS required to provide the connection between the private exchange and the public exchange is not coupled similarly to a normal sub-station by means of gas-filled tubes to the private exchange, since in this case the dialling pulses intended for the public exchange would be required to be transmitted through discharge paths of gas-filled tubes, which would give rise to the difficulty that the dialling pulses are either so weak that a relay arranged in the public exchange would not respond to them, or so intense that the gas-filled tubes are likely to be extinguished with the result that the connection already establised would be interrupted. Therefore the circuit-arrangement is such as to allow the subscriber's station AB to be connected to the public line SS directly by means of relay contacts 1*a*1 and 1*a*2 and consequently without the use of the private exchange. When the numeral 0 is dialled, the potential of the corresponding outgoing point 0 of the counting circuit TS is increased and the gas-filled tube V5 ignites. However, if the urban line is engaged, at least one of relays P, Q or R or 2A, 3A, and so on, associated with the lines of the remaining subscribers is energised and the ignition electrode $f2$ of the gas-filled tube V5 is connected to earth through a contact *p, q, r,* 1*a*3, 2*a*3, and so on, thus preventing the gas-filled tube V5 from igniting. The cathode circuit of the tube V5 comprises the parallel combination of a resistor R11 and a capacitor C8. Consequently the tube V5 extinguishes automatically after ignition. The cathode of the tube V5 is coupled through the multiple-wired point N3 and capacitors C9 to a tapping D1 on the potentiometer R3, R4, R5 associated with that tube of each subscriber's line circuit which couples the line concerned to the link circuit VCA. The tapping D1 is coupled through a rectifier G1 to the ignition electrode $f$ of the gas-filled tube V3 the cathode $k$ of which is earthed and the anode of which is connected through a winding of the relay 1A, a multiple wired point E and a resistor R12 to the high tension supply. Tappings, such as D2, on the other potentiometers are also connected to the electrode $f$ of the tube V3, by means of rectifiers such as G2. When the gas-filled tube V5 is ignited, the capacitors C9 transmit a positive pulse to the tappings D1 in the different subscriber's line circuits. Since, as was assumed, at this moment the gas-filled tube V1 is conductive, the ignition electrode $f1$ of this gas-filled tube and consequently the tapping D1 in the line associated with the subscriber AB are at a higher potential than the corresponding points of the remaining subscriber's lines. Thus, due to the said pulse the gas-filled tube V3 arranged in the line circuit of the subscriber AB will ignite, the gas-filled tubes V3, however, arranged in the line circuit of the remaining subscribers will not. Thereupon the relay 1A is energised and by means of its contacts 1*a*1 and 1*a*2 puts the subscriber's line through to the urban line SS with the result that the subscriber is directly connected to the public exchange and is enabled there to establish the desired connection normally. Due to the fact that the circuit through the primary windings of the transformer TA and contacts 1*a*1 and 1*a*2 is broken this transformer through the gas-filled tube V1 transmits a pulse to the link circuit VCA with the result that non-specified means not further described herein respond and restore the line circuit to the normal condition. However, the relay 1A remains energised until the call is ended and through its contact 1*a*5, the resistor R14 and the secondary winding of the transformer TA connects the multiple-wired point M to the positive terminal of the high tension supply with the result that the subscriber's line LC remains marked engaged. During the call the line loop SS1, SS2 of the public exchange is connected in a known manner not shown in the drawing through windings of a supply relay to a supply source with the result that the loop line SS1 is at a negative potential relative to earth. When the call is ended the voltage of the loop line SS1 is increased to earth potential with the result that the potential of the ignition electrode $f$ of the gas-filled tube V6 which electrode now has supplied to it a positive bias voltage through the contact 1*a*4 of the relay 1A and the resistor R13 is increased in a manner such that the gas-filled tube V6 ignites. The capacitor C11 transmits a negative pulse to the multiple-wired point E and thence to the anode of the gas-filled tube V3 of all the subscriber's lines with the result that the conductive tube V3 is extinguished and the relay 1A is released. The anode circuit of the tube V6 comprises the parallel combination of a resistor R15 and the capacitor C10 with the result that the tube V6 is extinguished automatically. The contact 1*a*4 of the relay 1A takes away the positive bias voltage from the ignition electrode $f$ of the tube V6 so that the tube V6 is prevented from re-igniting. Thus, the circuit-arrangement has returned to the normal position.

When a call comes in through the public line SS from the public exchange the alternating current relay P a winding of which is connected through capacitor C12 in parallel with the public line is energised by the action of the alternating ringing current supplied through the public line, the operator receiving by non-specified means a visual or acoustic signal signifying the fact that a call is waiting. In response to the call the operator switches her switch S from the normal position 1 to position 2 with the result that the relay Q responds and through contacts $q3$ and $q4$ puts the operator's station TF through to the public line SS, the holding circuit which the relay P had closed to itself through contact $p1$ being also interrupted by contact q1 being opened. After the operator has received the desired number she switches the operating switch S into position 3 with the result that a relay R is energised which through the contact $r1$ and a resistor R19 keeps the loop across the public line closed whilst at the same time the relay Q is released and again connects the station TF to the local subscriber's line. Since the receiver of the operator's station TF has been lifted, a pulse is set up in the transformer T with the result that the operating station is connected through a gas-filled tube, for example V4, to a link circuit, for example VCA, just as in the case of a normal call within the private exchange, as has been described before. Thereupon the operator dials the desired number so that she is connected in a manner described hereinbefore to the called subscriber, for example the subscriber AB. After he has reported himself the operator presses the operating button K with the result that through the capacitors C13 a positive pulse is applied to the ignition electrode $f1$ of the gas-filled tubes V5 in all the link circuits. The ignition electrodes $f1$ of the tubes V5 in the link circuits are connected through potentiometers R16, R17, R18 to the ignition electrodes $f1$ of the tubes (for example V4) coupling the multiple-wired point MT to the link circuit concerned. If the gas-filled tube V4 is conductive, the ignition electrode *f1* of this tube is at a higher potential than the corresponding ignition electrode of the remaining gas-filled tubes coupled to the multiple-wired point MT. Consequently the ignition electrode *f1* also of the gas-filled tube V5 arranged in the link circuit VCA will be at a higher bias voltage than the ignition electrodes *f1* of the corresponding tubes in the remaining link circuits. Consequently only the tube V5 included in the link VCA is ignited by the said pulse. As a result the cathode *k* of the tube V5 through the multiple-wired point M3 and the capacitor C9 transmits a positive pulse to the multiple-wired points D1 in the private exchange LC with the result that in a manner described hereinbefore the relay 1A included in the line of the desired subscriber AB is energised and his station is connected through the contact 1*a*1 and 1*a*2 to the public line SS.

What is claimed is:

1. A telephone circuit arrangement comprising a link circuit, a plurality of subscriber's lines, a plurality of gas-filled tubes connected between said link circuit and the respective said subscriber's lines and each containing a discharge path and an ignition electrode, means for selectively rendering said tubes conductive thereby selectively connecting said subscriber's lines to said link circuit through said discharge paths, a plurality of auxiliary discharge tubes respectively associated with said subscriber's lines and each containing a discharge path and a control electrode, means connecting said control electrodes respectively to said ignition electrodes whereby said auxiliary tubes are respectively placed in a state to become conductive in response to a positive potential applied to the control electrodes thereof only when the corresponding gas-filled tube is in a conductive state, pulse-producing means included in said link circuit for providing a positive-potential pulse, and means connected to apply said positive-potential pulse to the control electrodes of all of said auxiliary tubes, whereby an auxiliary tube will become conductive in response to said pulse only if the corresponding gas-filled tube is in a conductive state.

2. The circuit arrangement in accordance with claim 1, including means to generate a dialling signal, means connected to feed said dialling signal to one of said subscriber's lines, said pulse-producing means including means to generate said positive-potential pulse in response to said dialling signal, a remote exchange, a relay having an energizing winding connected in series with the discharge path of the auxiliary tube associated with said one subscriber's line and having contacts arranged to connect, when said winding is energized, the line circuit of said one subscriber's line to said remote exchange, means responsive to the termination of a call for generating an extinguishing pulse, and means connected to apply said extinguishing pulse to all of said auxiliary discharge tubes.

References Cited in the file of this patent

UNITED STATES PATENTS

| | | |
|---|---|---|
| 2,235,153 | Holden | Mar. 18, 1941 |
| 2,238,469 | Holden | Apr. 15, 1941 |
| 2,245,160 | Schimpf | June 10, 1941 |